(12) United States Patent
Buchner et al.

(10) Patent No.: US 6,630,261 B2
(45) Date of Patent: Oct. 7, 2003

(54) APPARATUS AND METHOD FOR UTILIZING THE WASTE HEAT OF AN AIR-COOLED FUEL CELL BATTERY

(75) Inventors: Peter Buchner, Heiligenstadt (DE); Rittmar Von Helmolt, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 235 days.

(21) Appl. No.: 09/781,172

(22) Filed: Feb. 12, 2001

(65) Prior Publication Data

US 2001/0049041 A1 Dec. 6, 2001

Related U.S. Application Data

(63) Continuation of application No. PCT/DE99/02449, filed on Aug. 6, 1999.

(30) Foreign Application Priority Data

Aug. 10, 1998 (DE) .......................... 198 36 143

(51) Int. Cl.[7] .............................................. H01M 8/04
(52) U.S. Cl. .......................................... 429/24; 429/26
(58) Field of Search .......................... 429/22, 24, 13, 429/26, 30, 12; 122/362; 261/104, 107; 340/607, 608, 611

(56) References Cited

U.S. PATENT DOCUMENTS 3,061,658 A    10/1962  Blackmer
3,668,905 A  * 6/1972  Schlunke ..................... 68/5 D
3,756,579 A  * 9/1973  Remick ....................... 261/92
4,640,873 A    2/1987  Tajima et al.
5,647,534 A    7/1997  Kelz et al.
2001/0010875 A1 * 8/2001  Katagiri et al. ............... 429/22
2001/0015500 A1 * 8/2001  Shimanuki et al. .......... 261/104

FOREIGN PATENT DOCUMENTS

| DE | 4442285 C1 | 2/1996 |
| DE | 19544483 A1 | 6/1997 |
| DE | 19629084 A1 | 1/1998 |
| FR | 1557731 | 2/1969 |
| JP | 57157470 | 9/1982 |
| JP | 59009869 | 1/1984 |
| JP | 62143662 | 10/1986 |
| JP | 62188178 | 8/1987 |
| JP | 04082167 | 3/1992 |
| JP | 06260200 | 9/1994 |
| JP | 10284107 | 10/1998 |

* cited by examiner

Primary Examiner—Randy Gulakowski
Assistant Examiner—Monique Wills
(74) Attorney, Agent, or Firm—Laurence A. Greenberg; Werner H. Stemer; Ralph E. Locher

(57) ABSTRACT

A heat exchange cell and to a method of utilizing the waste heat of an air-cooled fuel cell battery is described. The heat exchange cell is of a configuration similar to that of the fuel cell and, in the stack, should directly adjoin the fuel cell battery, so that the spent cooling air is utilized to heat a medium without an intermediate line.

4 Claims, 2 Drawing Sheets

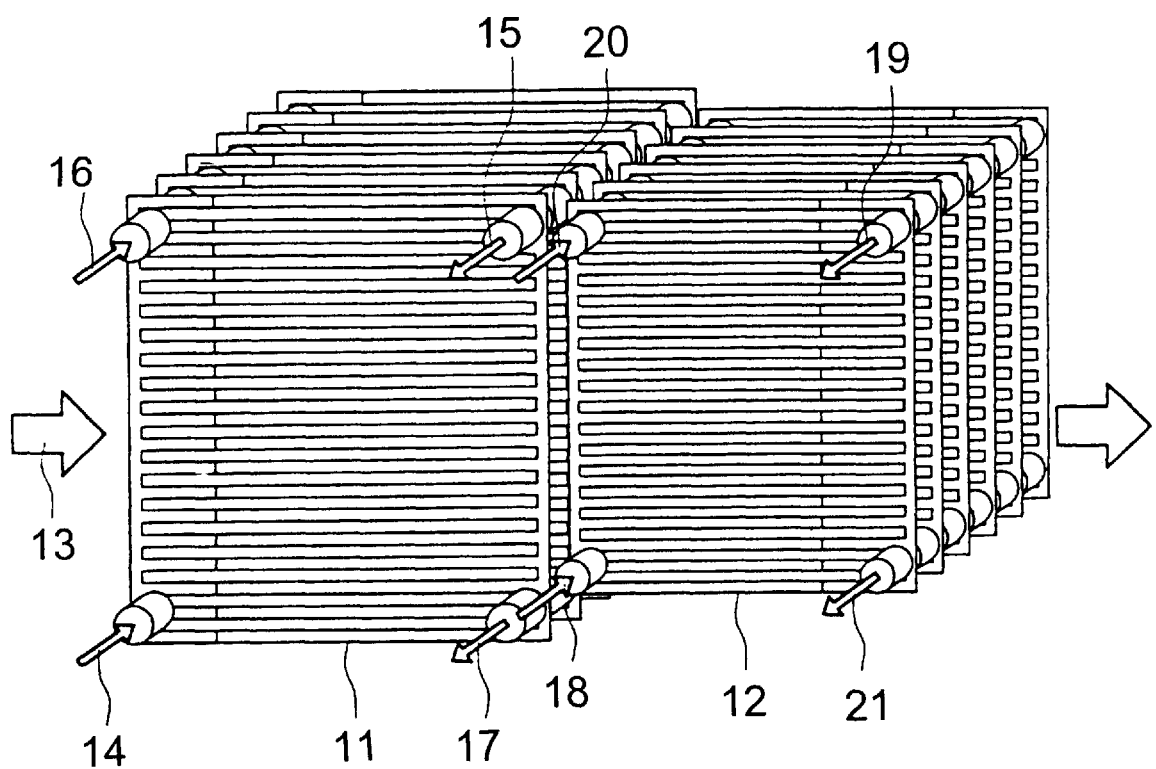

APPARATUS AND METHOD FOR UTILIZING THE WASTE HEAT OF AN AIR-COOLED FUEL CELL BATTERY

CROSS-REFERENCE TO RELATED APPLICATION

This application is a continuation of copending International Application No. PCT/DE99/02449, filed Aug. 6, 1999, which designated the United States.

BACKGROUND OF THE INVENTION

Field of the Invention

The invention relates to an apparatus containing a heat exchange cell for utilizing waste heat of an air-cooled fuel cell. The invention also relates to a method of rendering utilizable the waste heat of a fuel cell (FC) battery containing a stack of fuel cells.

German Patent DE 44 42 285 C1 describes an air-cooled polymer electrolyte membrane (PEM) fuel cell which contains a negative terminal plate, a negative electrode, a membrane, a positive electrode and a positive terminal plate. The two terminal plates (or separator plates) are joined, in a mechanically fixed, gas-tight and electronically insulating manner, to the membrane via a frame element. To protect the membrane against drying out, the process gases supplied are at least partially humidified. To this end, the process gases are passed through a humidifier, e.g. a membrane humidifier, in which they are admixed with evaporated water.

In the case of liquid-cooled fuel cells, the humidifiers are perfused by the spent liquid coolant and are heated thereby. The extraction of heat from the cooling air, however, is more problematic, and so far no suitable heat exchangers exist which render the heat required for evaporation available from the spent cooling air. With the air-cooled fuel cell it has therefore been necessary, hitherto, for such energy of evaporation to be raised externally.

Published, Japanese Patent Application JP 61-243662 A discloses blockwise air cooling of a complete fuel cell stack by interposed stacks of heat exchangers. Additionally, Japanese Patent Application JP 10-284107 A describes a fuel cell stack containing heat exchangers that directly adjoin the stack. Finally, Published Japanese Patent Application JP 57-157470 A proposes cooling plates for use in a fuel cell stack, wherein the cooling plates are integrated into the fuel cell stack. In general, partitions are provided for this purpose in the heat exchangers.

SUMMARY OF THE INVENTION

It is accordingly an object of the invention to provide an apparatus and a method for utilizing the waste heat of an air-cooled fuel cell battery which overcome the above-mentioned disadvantages of the prior art devices and methods of this general type, via which the waste heat of an air-cooled PEM fuel cell can be rendered utilizable with greater efficiency.

With the foregoing and other objects in view there is provided, in accordance with the invention, an apparatus for utilizing a waste heat of an air-cooled fuel cell. The apparatus includes a heat exchange cell containing at least two plates being end plates or separator plates and a thermally conductive plate disposed in relation to the two plates to enclose a first chamber and a second chamber. During operation the first chamber receives a spent cooling air, and a humidifier membrane is disposed in the second chamber and subdivides the second chamber into a first subchamber and a second subchamber. During operation the first subchamber receives water and the second subchamber receives a process gas to be humidified.

In accordance with an added feature of invention, the heat exchange cell directly adjoins the air-cooled fuel cell.

In the invention, a humidifier through which the process gases or a process gas for the fuel cell battery are passed, is integrated into a heat exchange cell. In this configuration, each heat exchange cell is of such construction that the first separator plate together with the thermally conductive contact plate encloses a gas chamber in which the spent cooling air is ducted from the fuel cell stack, and a second separator plate together with the contact plate encloses a second chamber in which a humidifier membrane is disposed centrally. The humidifier membrane, together with the contact plate, defines the chamber in which the water for humidification is heated via the contact plate by where the waste heat of the fuel cell stack and, together with the separator plate, delimits the chamber in which the process gas to be humidified is ducted.

In the method according to the invention of rendering utilizable the waste heat of an air-cooled fuel cell battery, the spent cooling air is passed through a stack of heat exchange cells and in the process gives off its heat. It is advantageous for the heat exchange cell for utilizing the waste heat to adjoin the fuel cell battery directly, so that no heat will be lost via intermediate lines.

With the foregoing and other objects in view there is further provided, in accordance with the invention, a method of using utilizable waste heat of an air-cooled cell battery containing a stack of fuel cells. The method includes providing an apparatus for utilizing the waste heat of the air-cooled cell battery. The apparatus includes a stack of heat exchange cells, each of the heat exchange cells contains at least two plates selected being end plates or separator plates, a thermally conductive plate disposed in relation to the two plates to enclose a first chamber and a second chamber; and a humidifier membrane disposed in the second chamber and subdividing the second chamber into a first subchamber and a second subchamber. The first subchamber receives water and the second subchamber receives a process gas to be humidified. Spent cooling air is conducted through the first chamber of the heat exchange cells, the spent cooling air giving off its heat to the water and the process gas.

In accordance with another mode of the invention, there is the step of setting a number of the heat exchange cells in the heat exchange cell stack to be identical to a number of fuel cells in stack of fuel cells.

Other features which are considered as characteristic for the invention are set forth in the appended claims.

Although the invention is illustrated and described herein as embodied in an apparatus and a method for utilizing the waste heat of an air-cooled fuel cell battery, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a perspective view of a configuration containing a fuel cell stack with an adjoining heat exchange cell stack.

DESCRIPTION OF THE PREFERRED EMBODIMENTS

In general, a cell referred to as a heat exchange cell contains at least two separator plates and a thermally conductive contact plate. These three plates are bonded together e.g. by a filter press technique, by lateral clamping, by a bead, by soldering or by cementing. The two separator plates are preferably made of an inexpensive, light and thermally conductive material, e.g. plastic or metal, from which they can be fabricated cost-effectively by processes suitable for mass production. Preferably, the separator plates have distribution channels like the corresponding terminal or separator plates of the fuel cell, in order to make available as large an area as possible for heat dissipation. The thermally conductive contact plate should likewise be embossed and/or molded and again be made of as inexpensive and light a material as possible, whose thermal conductivity directly codetermines the efficiency and the energetic benefit of the invention. The distribution channels can e.g. be flutes and/or grooves which are preferably debossed into the plates.

Figure 1:
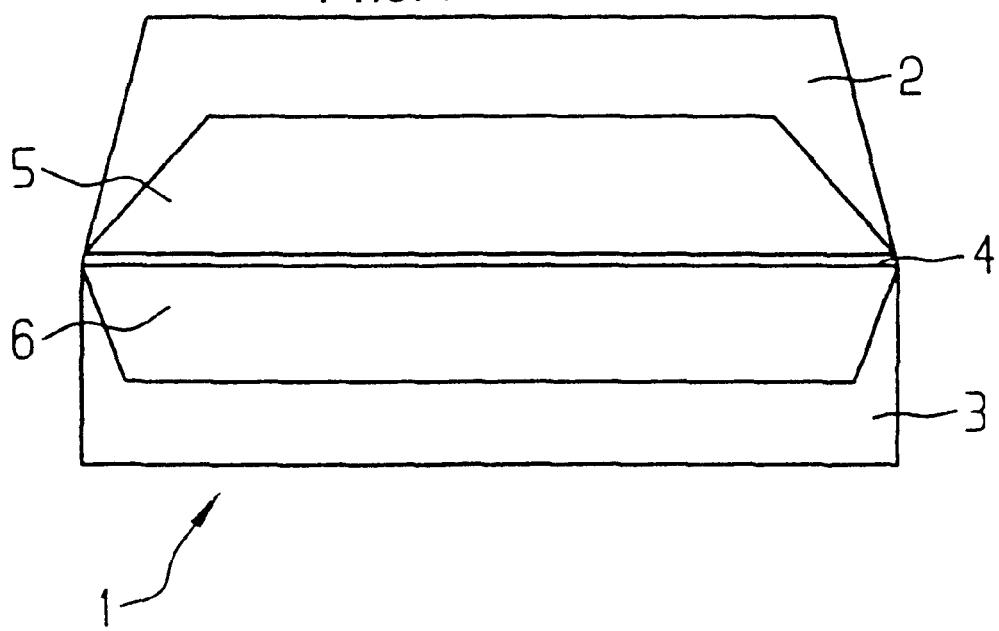
FIG. 1 is a diagrammatic, cross-sectional view through a known heat exchange cell.

In all the figures of the drawing, sub-features and integral parts that correspond to one another bear the same reference symbol in each case. Referring now to the figures of the drawing in detail and first, particularly, to FIG. 1 thereof, there is shown the simplest form of a heat exchange cell 1 in cross section. At a top and a bottom is one separator plate 2, 3 each, and in the center is a thermally conductive contact plate 4. For the sake of simplicity, distribution channels, which are preferably also present, are not shown. The separator plate 2, together with the contact plate 4, encloses a chamber 5 through which spent cooling air is ducted. As a result, the contact plate 4 heats up even on a side that faces a further chamber 6 which is enclosed by the contact plate 4 together with the separator plate 3. Present in the further chamber 6 is a medium to be heated, e.g. air in a passenger compartment of a vehicle propelled by PEM fuel cells. For safety reasons, the passenger compartment of these vehicles cannot be heated using the spent cooling air directly.

Preferably, a plurality of heat exchange cells are combined into a stack (e.g. by a filter press technique and/or soldered), which directly adjoins the fuel cell stack. A top side of the separator plate 2 then again borders a chamber, corresponding to the further chamber 6, of the top heat exchange cell. Preferably, the separator plate 2 in this configuration will likewise be made from thermally conductive material to enable heat transfer from the separator plate 2 to the medium to be heated. In this case, both sides of the separator plates are preferably provided with distribution channels, which results in that a corrugated metal-like structure may possibly be advantageous. The edge seals and the conduits are non-critical, as long as the various gas and media chambers are separated from one another in a sufficiently impermeable manner.

Preferably, the contact plate 4 always has distribution channels on both sides. The medium to be heated is preferably air or water (e.g. as a stationary application for heating service water) or some other fluid. Equally, however, the heat exchange cell can be used for heating any type of medium.

Figure 2:
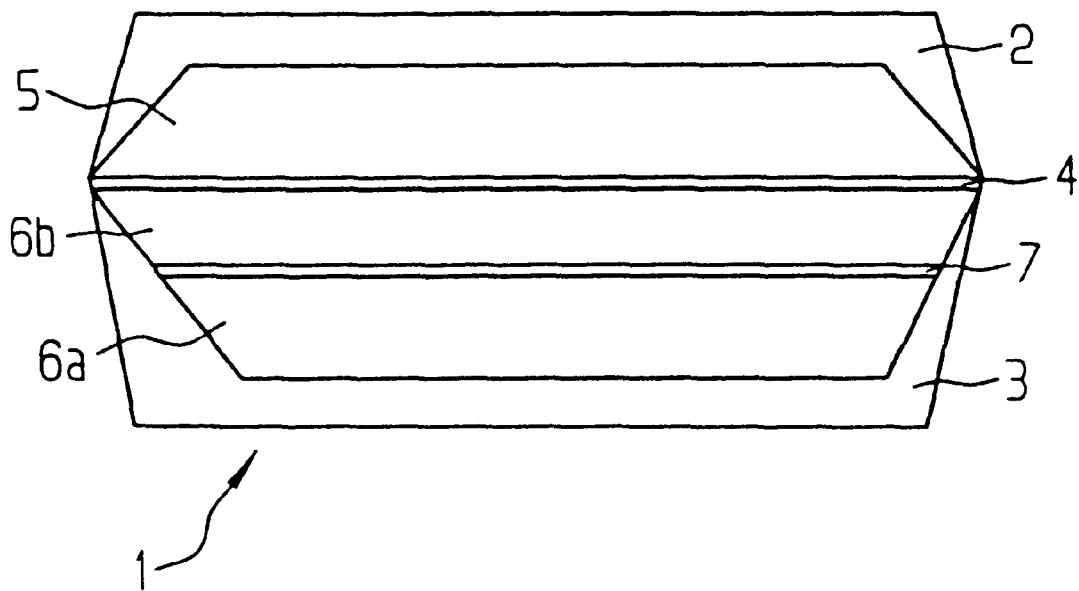
FIG. 2 is a cross-sectional view through the heat exchange cell according to the invention.

FIG. 2 again shows a schematic cross section through the heat exchange cell 1 according to the invention. At the top, the separator plate 2 can again be seen which, together with the contact plate 4, encloses the chamber 5 in which the spent cooling air is ducted. In this refinement of the invention, in which the spent cooling air is utilized to heat the humidifier, the further chamber 6 enclosed by the contact plate 4 together with the bottom separator plate 3 is subdivided by a humidifier membrane 7. Flowing above the humidifier membrane 7, in a chamber 6b, is the water that is to be heated, and flowing below the humidifier membrane 7, in a chamber 6a, is the process gas that is to be humidified.

The humidifier membrane 7 is made of a water-permeable plastic or of some other water-conducting material. Of course, it can also be identical with a proton-conducting membrane from the fuel cell.

FIG. 3 shows a configuration of a fuel cell stack with an adjoining heat exchange cell stack. On the left-hand side of the picture there is a fuel cell stack 11 which is of prior art construction and at its front end plate has process gas inlets 14, 16 and gas outlets 15, 17. The arrows in each case indicate a flow direction of the process gas (oxidizing agent and/or fuel), thus allowing the gas inlets 14, 16 and the gas outlets 15, 17 to be identified as such.

An arrow 13 indicates the direction in which the cooling air flows through the two stacks 11 and 12, being heated in the fuel cell stack 11 and giving the heat off again in the heat exchange stack 12.

Disposed adjoining the fuel cell stack 11 is the heat exchange cell stack 12. In terms of construction it is almost identical with the fuel cell stack, except that it can be substantially simpler and less expensive in terms of insulation, electrical conductivity, material requirements (corrosion resistance etc.), without its functionality being impaired. Additionally, the heat exchange cell stack 12 has inlets and outlets at its end plate that is shown in the FIG. 3. For the embodiment shown, in which the heat exchange cells are integrated into a humidifier, there is an inlet 18 of the dry process gas, an outlet 19 of the humidified process gas, an inlet 20 of the humidification water and an outlet 21 of the humidification water.

We claim:

1. An air-cooled fuel cell battery, comprising:
    at least one air-cooled fuel cell stack with a number of fuel cells driven by a process gas and producing a waste heat; and
    an apparatus for utilizing the waste heat, said apparatus having a stack of heat exchange cells, each of said heat exchange cells containing:
        at least two plates selected from the group consisting of end plates and separator plates;
        a thermally conductive plate disposed in relation to said two plates to enclose a first chamber and a second chamber, during operation said first chamber receiving a spent cooling air; and
        a humidifier membrane disposed in said second chamber and subdividing said second chamber into a first subchamber and a second subchamber, during operation said first subchamber receiving water and said second subchamber receiving the process gas to be humidified;
        the process gas being simultaneously cooled and humidified respectively.

2. The fuel cell battery according to claim 1, wherein said heat exchange cell stack directly adjoins said air-cooled fuel cell stack.

3. A method of using utilizable waste heat of an air-cooled fuel cell battery containing at least one stack of fuel cells, which comprises the steps of:
    providing an apparatus including a stack of heat exchange cells, each of the heat exchange cells containing:
        at least two plates selected from the group consisting of end plates and separator plates;
        a thermally conductive plate disposed in relation to the two plates to enclose a first chamber and a second chamber; and
        a humidifier membrane disposed in the second chamber and subdividing the second chamber into a first subchamber and a second subchamber, the first subchamber receiving water and the second subchamber receiving a process gas to be humidified; and passing spent cooling air through the first chamber of the heat exchange cells, the spent cooling air giving off its heat to the water and the process gas.

4. The method according to claim 3, which comprises setting a number of the heat exchange cells in the heat exchange cell stack to be identical to a number of fuel cells in the stack of fuel cells.

* * * * *